(12) United States Patent
Suzuki (10) Patent No.: US 8,582,148 B2
(45) Date of Patent: Nov. 12, 2013

(54) IMAGE PROCESSING APPARATUS AND IMAGE PROCESSING METHOD

(75) Inventor: Takayuki Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 967 days.

(21) Appl. No.: 12/558,923

(22) Filed: Sep. 14, 2009

(65) Prior Publication Data

US 2010/0067048 A1 Mar. 18, 2010

(30) Foreign Application Priority Data

Sep. 17, 2008 (JP) ................................. 2008-237498

(51) Int. Cl.
*G06F 3/12* (2006.01)
*G06F 3/048* (2013.01)
*G06K 15/00* (2006.01)

(52) U.S. Cl.
USPC ......... 358/1.15; 358/1.18; 358/403; 715/838; 382/173; 382/181; 382/190; 382/195; 382/206; 382/209; 382/305; 707/723

(58) Field of Classification Search
None
See application file for complete search history.

(56) References Cited

U.S. PATENT DOCUMENTS

| | | | |
|---|---|---|---|
| 7,580,568 B1 * | 8/2009 | Wang et al. | 382/173 |
| 8,046,717 B1 * | 10/2011 | Goel et al. | 715/838 |
| 8,090,222 B1 * | 1/2012 | Baluja et al. | 382/305 |
| 2004/0083241 A1 | 4/2004 | Mifune | |
| 2005/0160369 A1 * | 7/2005 | Balabanovic et al. | 715/766 |
| 2005/0207622 A1 * | 9/2005 | Haupt et al. | 382/118 |
| 2005/0237391 A1 | 10/2005 | Shibuya et al. | |
| 2006/0026524 A1 * | 2/2006 | Ma et al. | 715/713 |
| 2007/0180355 A1 * | 8/2007 | McCall et al. | 715/501.1 |
| 2008/0170132 A1 * | 7/2008 | Yi et al. | 348/222.1 |
| 2009/0132922 A1 | 5/2009 | Shibuya et al. | |
| 2009/0208118 A1 * | 8/2009 | Csurka | 382/228 |

FOREIGN PATENT DOCUMENTS

| | | | |
|---|---|---|---|
| JP | 2004-145568 | A | 5/2004 |
| JP | 2005-309995 | A | 11/2005 |
| JP | 2006279119 | A | 10/2006 |
| JP | 2006279939 | A | 10/2006 |
| JP | 2007094990 | A | 4/2007 |
| JP | 2008040562 | A | 2/2008 |
| WO | 2007120455 | A1 | 10/2007 |

\* cited by examiner

Primary Examiner — King Poon
Assistant Examiner — Vincent Peren
(74) Attorney, Agent, or Firm — Canon USA Inc IP Division (57) ABSTRACT

In a conventional image processing apparatus configured to display a preview image of a representative page of an image file including a plurality of pages and including a plurality of pieces of image data, it is difficult for a user to easily recognize, from the preview image, the content of the image file stored in a storage medium. In a technique according to the present invention, a page having a high evaluation value is detected, and a reduced image of the detected page is produced. The resultant reduced image is displayed as the preview image thereby allowing a user to easily recognize the content of the file.

10 Claims, 14 Drawing Sheets

| PAGE PROPERTY | WEIGHTING FACTOR |
|---|---|
| COVER SHEET | 4.0 |
| PRIMARY TITLE | 2.0 |
| SECONDARY TITLE | 1.5 |
| THIRD TITLE | 1.2 |
| OTHERS | 1.0 |

IMAGE PROCESSING APPARATUS AND IMAGE PROCESSING METHOD

BACKGROUND OF THE INVENTION

1. Field of the Invention

The present invention relates to image processing including displaying a preview image of data including a plurality of pages, and more particularly, to an image processing apparatus, an image processing method, and a storage medium in which a computer program is stored, adapted to display a preview image of data including a plurality of pages.

2. Description of the Related Art

In recent years, an increasing in popularity of digital cameras has brought about an increasing in use of image files, and use of image files is still increasing quickly. In many applications such as an electronic album, data including a plurality of image files is used. A great advance of performance and functionality of operating systems (OS) and application software has been made, and an improvement has been achieved in performance and functionality of previewing the content of files.

In previewing, it is common to display a preview image of data of a first page. In a particular type of data including a plurality of pages such as a document or a presentation file, a title is described in a first page thereof, and thus displaying the first page for previewing allows a user to easily recognize the content of the data.

However, in most cases of data of laid-out images, data does not have a cover sheet or a title is not described in a first page thereof. Therefore, displaying the first page for previewing does not allow a user to easily recognize the content of the data.

In a technique disclosed in Japanese Patent Laid-Open No. 2004-145568, pages of a file are sequentially displayed for previewing so that a user is allowed to easily recognize the content of the file. In a technique disclosed in Japanese Patent Laid-Open No. 2005-309995, an image added last to electronic album data is selected as a representative image and this representative image is displayed for previewing.

In the technique disclosed in Japanese Patent Laid-Open No. 2004-145568 and also in the technique disclosed in Japanese Patent Laid-Open No. 2005-309995, a preview image of a file is displayed so that a user is allowed to easily recognize the content of the file.

However, the technique disclosed in Japanese Patent Laid-Open No. 2004-145568 has a problem that all pages are sequentially displayed for previewing regardless of whether an individual page is useful or not for a user to recognize the content of the file, and thus the user has to view a plurality of preview images that are displayed sequentially.

The technique disclosed in Japanese Patent Laid-Open No. 2004-145568 has a problem that because the selection of a preview image is performed according to the method of producing electronic album data, i.e., a last image added to the electronic album is selected as the preview image, the selected preview image is not necessarily one that has typical characteristics of the album data.

In view of the above, the present invention provides an image processing apparatus capable of storing data including a plurality of image files each including a plurality of pages in a storage medium and capable of presenting a preview image that allows a user to easily recognize the content of the data stored in the storage medium.

SUMMARY OF THE INVENTION

According to an aspect of the present invention, there is provided an image processing apparatus capable of displaying a preview image of a representative page of an image file including a plurality of pages and including a plurality of pieces of image data, comprising an evaluation value acquisition unit that acquires an evaluation value described in each piece of image data, a page determination unit that determines the representative page to be displayed as the preview image, a reduced image producing unit that produces a reduced image of the page determined by the page determination unit, and a storing unit that stores the reduced image as a part of the image file in the image processing apparatus, the page determination unit being adapted to calculate an evaluation value of each page of the image file from the evaluation value described in each piece of image data acquired by the evaluation value acquisition unit, and determine the page to be displayed as the preview image, based on the result of the calculation.

According to another aspect of the present invention, there is provided a method of controlling an image processing apparatus capable of displaying a preview image of a representative page of an image file including a plurality of pages and including a plurality of pieces of image data, comprising acquiring an evaluation value described in each piece of image data, determining the representative page to be displayed as the preview image, # producing a reduced image of the page determined in the determining the representative page, and storing the reduced image as a part of the image file, the determining the representative page including calculating an evaluation value of each page of the image file from the evaluation value described in each piece of image data acquired in the acquiring the evaluation value, and determining the page to be displayed as the preview image, based on the result of the calculation.

According to another aspect of the present invention, there is provided a computer-readable storage medium in which a computer program is stored, the program causing a computer to control an image processing apparatus capable of displaying a preview image of a representative page of an image file including a plurality of pieces of image data forming a plurality of pages, the computer program comprising acquiring an evaluation value described in each piece of image data, determining the representative page to be displayed as the preview image, producing a reduced image of the page determined in the determining the representative page, and storing the reduced image as a part of the image file, the determining the representative page including calculating an evaluation value of each page of the image file from the evaluation value described in each piece of image data acquired in the acquiring the evaluation value, and determining the page to be displayed as the preview image, based on the result of the calculation.

Thus in the image processing apparatus/method according to the present invention, data including a plurality of image files each including a plurality of pages is stored in a storage medium, and a preview image is presented thereby allowing a user to easily recognize the content of the data stored in the storage medium.

Further features of the present invention will become apparent from the following description of exemplary embodiments with reference to the attached drawings.

DESCRIPTION OF THE EMBODIMENTS

Figure 1:
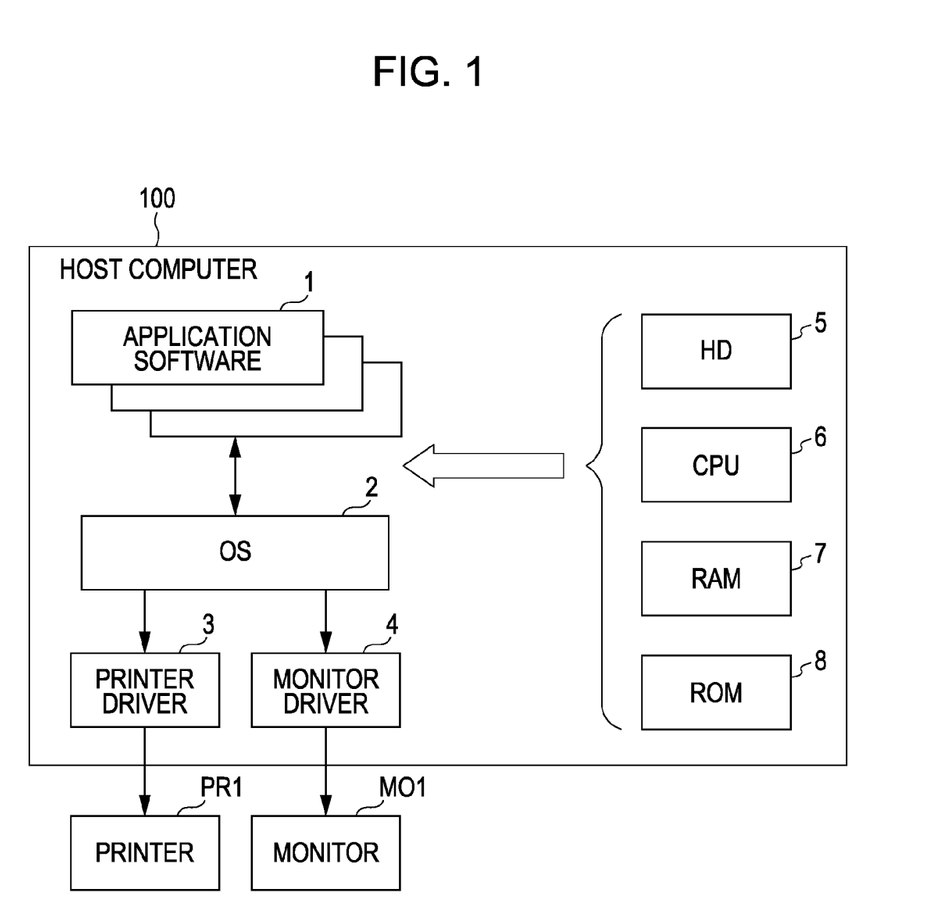
FIG. 1 is a block diagram illustrating a configuration of a host computer according to an embodiment of the present invention.

FIG. 1 is a block diagram illustrating a configuration of a host computer 100 according to a first embodiment of the invention.

The host computer 100 is an example of an image processing apparatus. The host computer 100 is connected to a printer PR1 and a monitor MO1.

The host computer 100 includes application software 1, an operating system (OS) 2, a printer driver 3, a monitor driver 4, a hard disk (HD) 5, a CPU 6, a RAM 7, and a ROM 8.

The application software 1 includes word processing software, spreadsheet software, Internet browser software, etc. If the application software 1 issues a set of draw commands (including an image draw command, a text draw command, and a graphics draw command) associated with an output image, the set of draw commands is input to the monitor driver 4 via the OS 2. In a case where printing is performed, the set of draw commands is also input to the printer driver 3 via the OS 2.

The printer driver 3 is software adapted to process the set of draw commands to produce print data, which is supplied to the printer PR1.

The monitor driver 4 is software adapted to process the set of draw commands thereby to control the monitor MO1 to display an image.

For example, an IBM/AT-compatible personal computer may be used as the host computer 100, and Microsoft Windows XP may be used as the OS 2. Application software having printing functionality may be installed on this personal computer, and the monitor MO1 and the printer PR1 may be connected thereto.

Using the application software 1, the host computer 100 produces output image data from text data such as character data, graphics data, image data such as picture image data, etc. The resultant output image data is displayed on the monitor MO1. In a case where an image is printed according to the output image data, the application software 1 issues a print request to the OS 2. Subsequently, the application software 1 issues, to the OS 2, a set of draw commands including a set of text draw commands associated with text data, a set of graphics draw commands associated with graphics data, and a set of image draw commands associated with image data.

Figure 2:
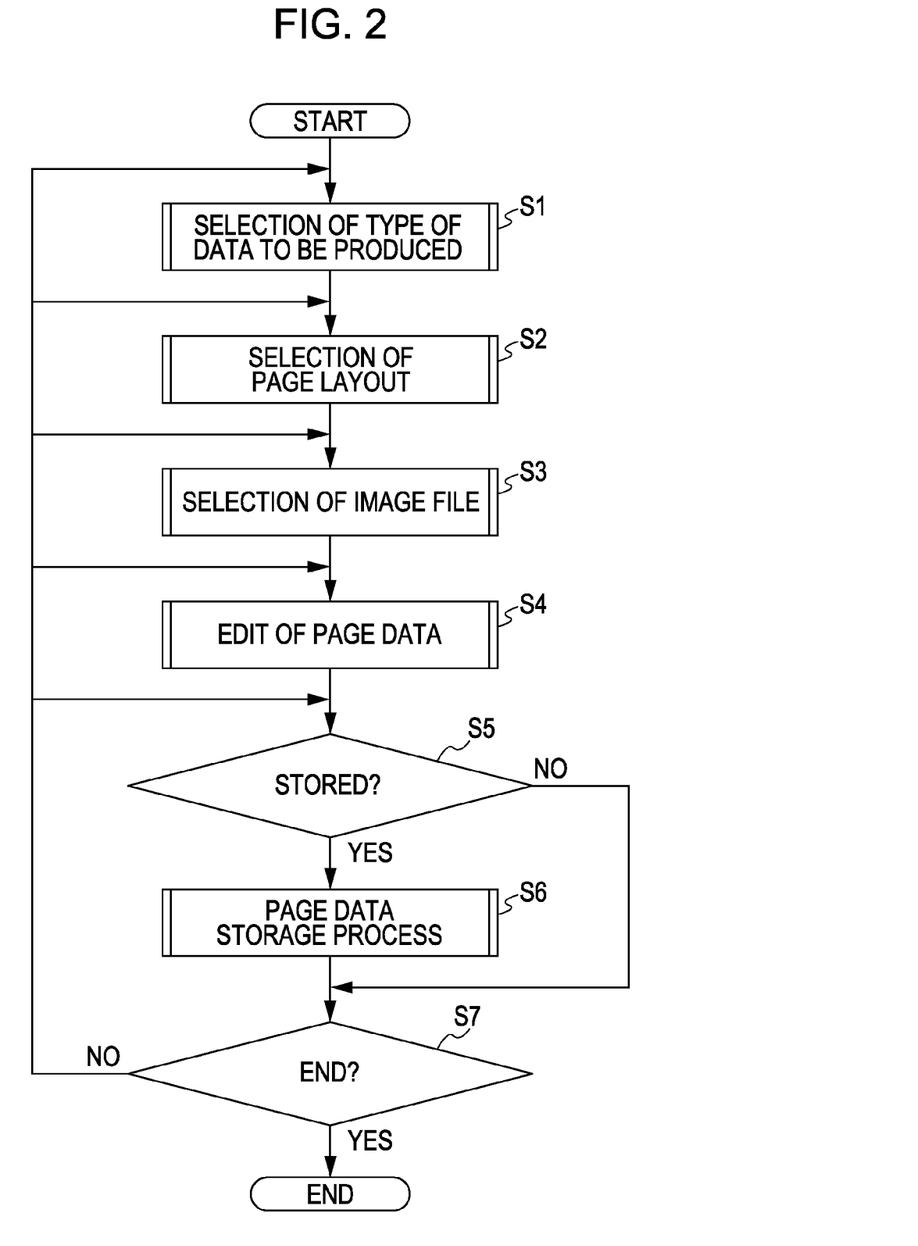
FIG. 2 is a flow chart illustrating a process performed by application software.

FIG. 2 is a flow chart illustrating a process performed by the application software 1.

If the application software 1 is started, then in step S1, a data type selection screen for selecting a type of data to be produced is displayed. This data type selection screen allows a user to select a data type from a set of data types including picture print data, album data, calendar data, etc. Next, in step S2, a page layout selection screen is displayed depending on the data type selected in step S1.

Figure 3:
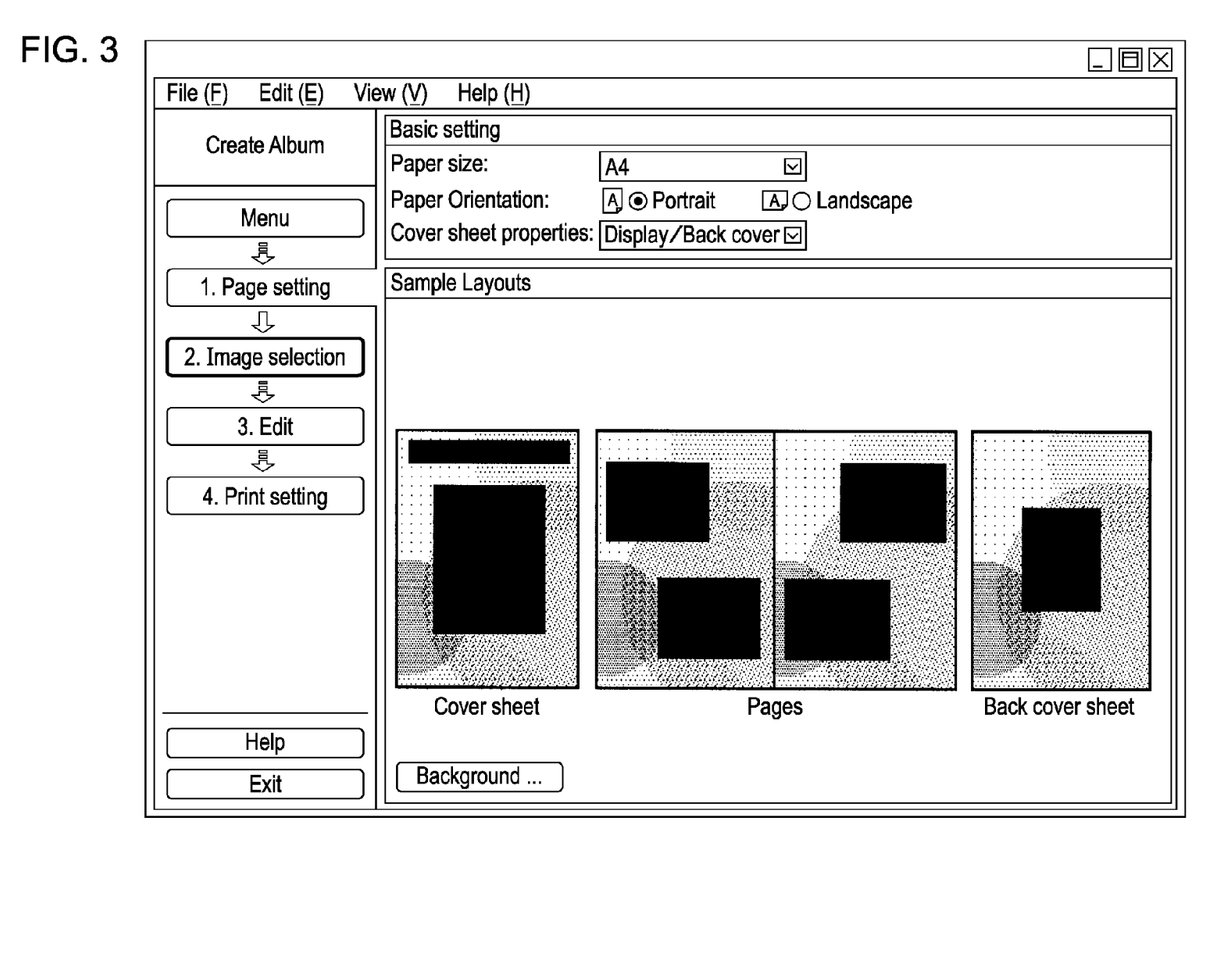
FIG. 3 is a diagram illustrating an example of a page layout selection screen.

FIG. 3 illustrates an example of a page layout selection screen.

In the example shown in FIG. 3, the page layout selection screen allows a user to select a paper size, an paper orientation, a background, etc.

Figure 4:
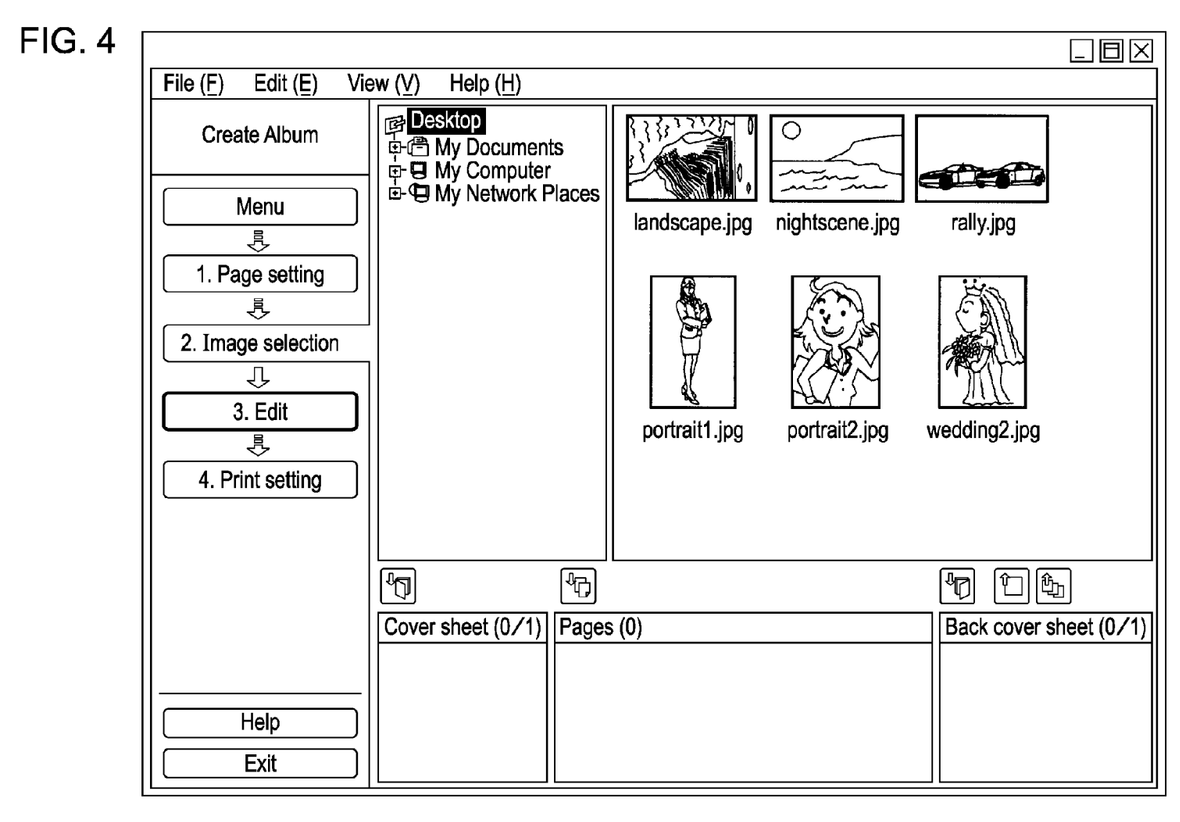
FIG. 4 is a diagram illustrating an example of an image file selection screen.

FIG. 4 illustrates an example of an image file selection screen.

In step S3, using the image file selection screen shown in FIG. 4, an image file to be inserted in each page of the album shown in FIG. 3 is selected.

Figure 5:
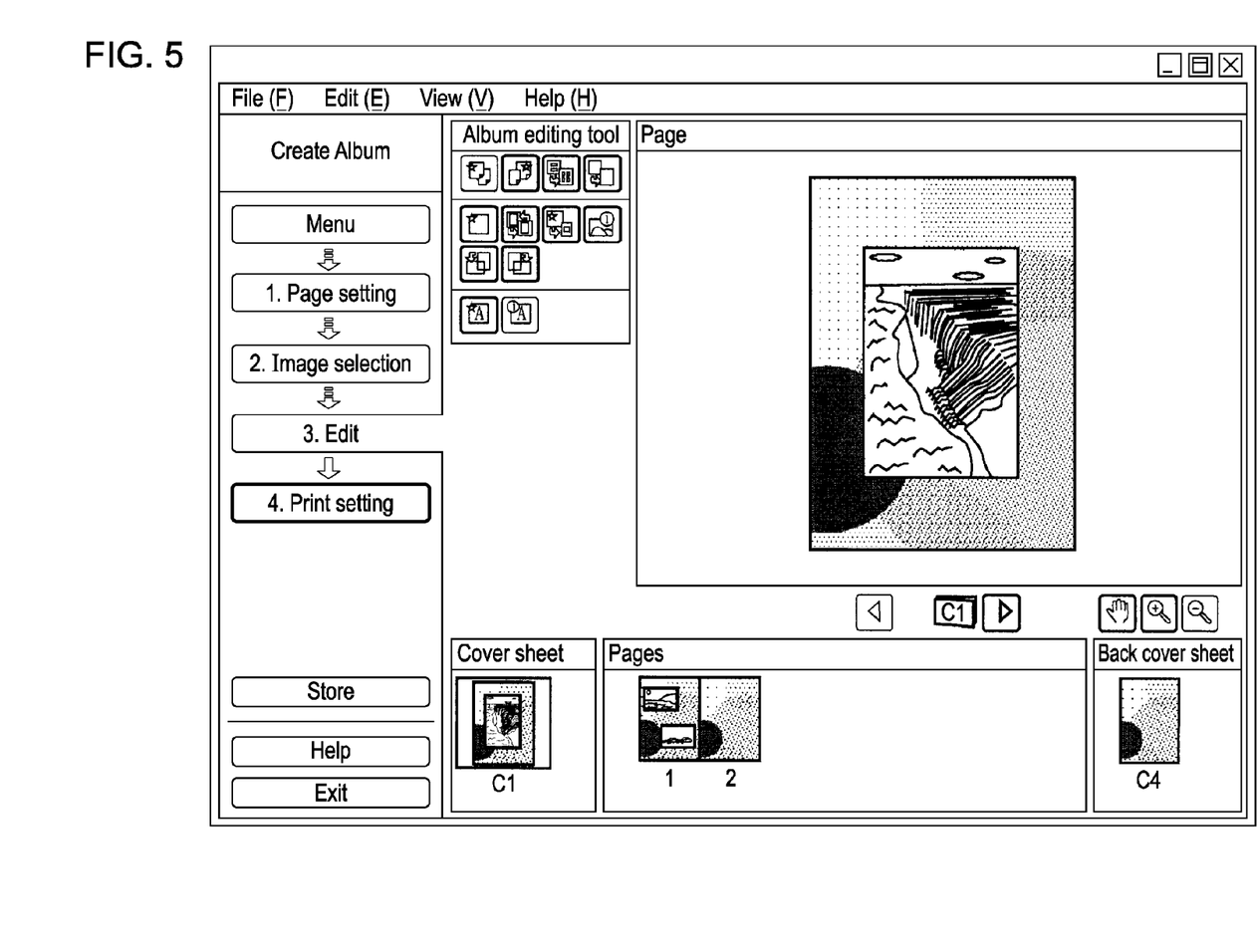
FIG. 5 is a diagram illustrating an example of an edit screen.

FIG. 5 illustrates an example of an edit screen.

In step S4, using the edit screen shown in FIG. 5, page data is edited by determining the location of the input image and text.

Thereafter, if a storage request is issued in step S5, then in step S6, the edited page data is stored. Next, in step S7, if a request to end the process of the application software 1 is issued, the process is ended. However, if a request to end the process of the application software 1 is not issued in step S7, the processing flow returns to one of steps S1 to S5.

Figure 6:
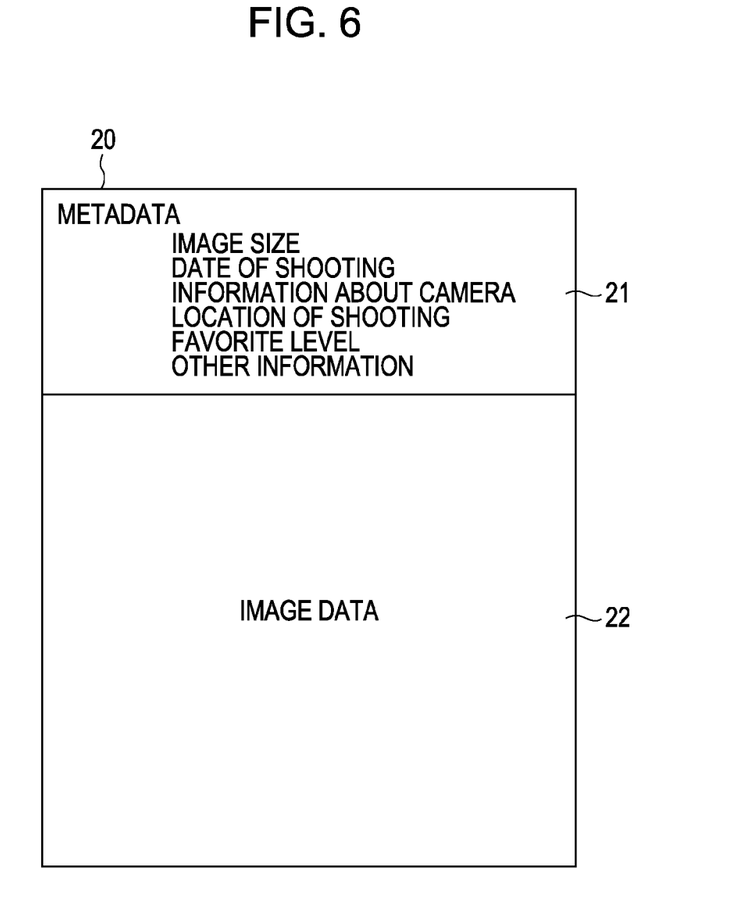
FIG. 6 is a diagram illustrating an example of a structure of an image file.

FIG. 6 illustrates an example of a structure of an image file 20.

In the case of an image taken by a digital camera or the like, an image file thereof includes metadata 21, which is information about the image, in addition to image data 22. The metadata 21 may include information indicating the image size (the number of pixels), information indicating image-taking conditions, information associated with a camera used, information indication a location where the image was taken, information indicating a score of favorite. Note that the score of favorite is given as a result of evaluation on the image data 22. More specifically, the evaluation may be performed according to conditions in terms of exposure, focus, etc., when the image is taken by the digital camera or when the image is processed by the image editing software, and the result of the evaluation may be recorded as the score of favorite. The score of favorite may be set according to an input provided by a user.

Figure 7:
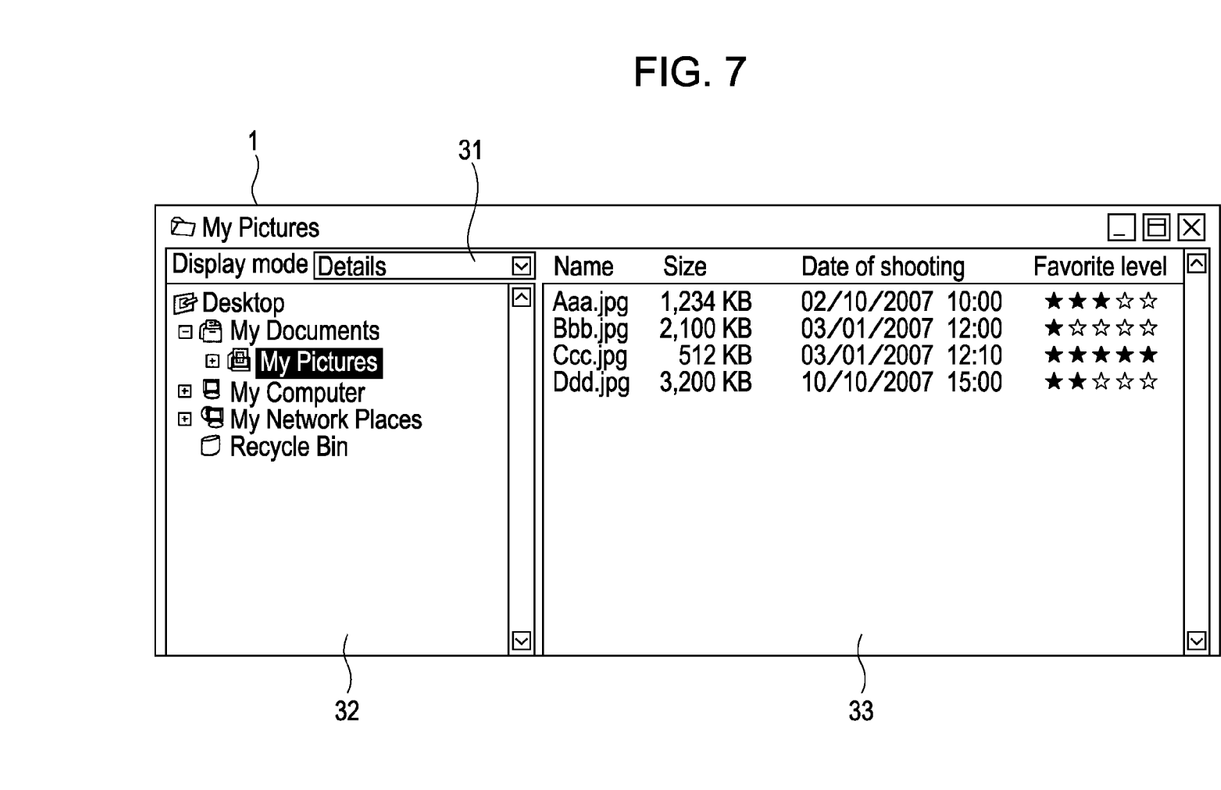
FIG. 7 is a diagram illustrating an example of a view displayed by a file display/selection application software running on a host computer for a case in which a "Details" mode is selected in a file display mode selection box.

FIG. 7 illustrates an example of a view displayed by the file display/selection application software 1 running on the host computer 100 for a case in which a "Preview" mode is selected in the file display mode selection box 31.

A folder selection pane 32 enables a user to select a folder in which one or more files are stored. In a file display pane 33, information associated with files located in the selected folder is displayed. The score of favorite for each file displayed in this pane may be changed by a user by using this pane.

Figure 8:
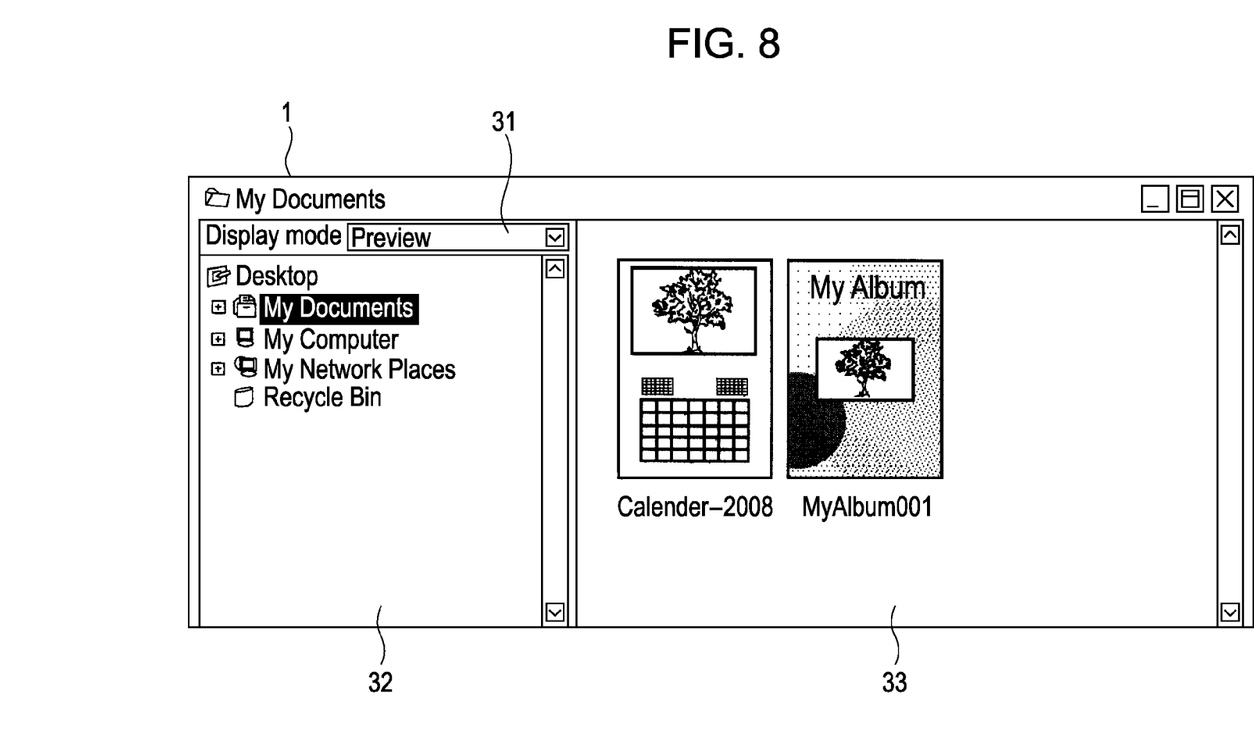
FIG. 8 is a diagram illustrating an example of a view displayed by a file display/selection application software running on a host computer for a case in which a "Preview" mode is selected in a file display mode selection box.

FIG. 8 illustrates an example of a view displayed by the file display/selection application software 1 running on the host computer 100 for a case in which a "Preview" mode is selected in the file display mode selection box 31.

The file display pane 33 displays preview images of files located in the selected folder.

Figure 9:
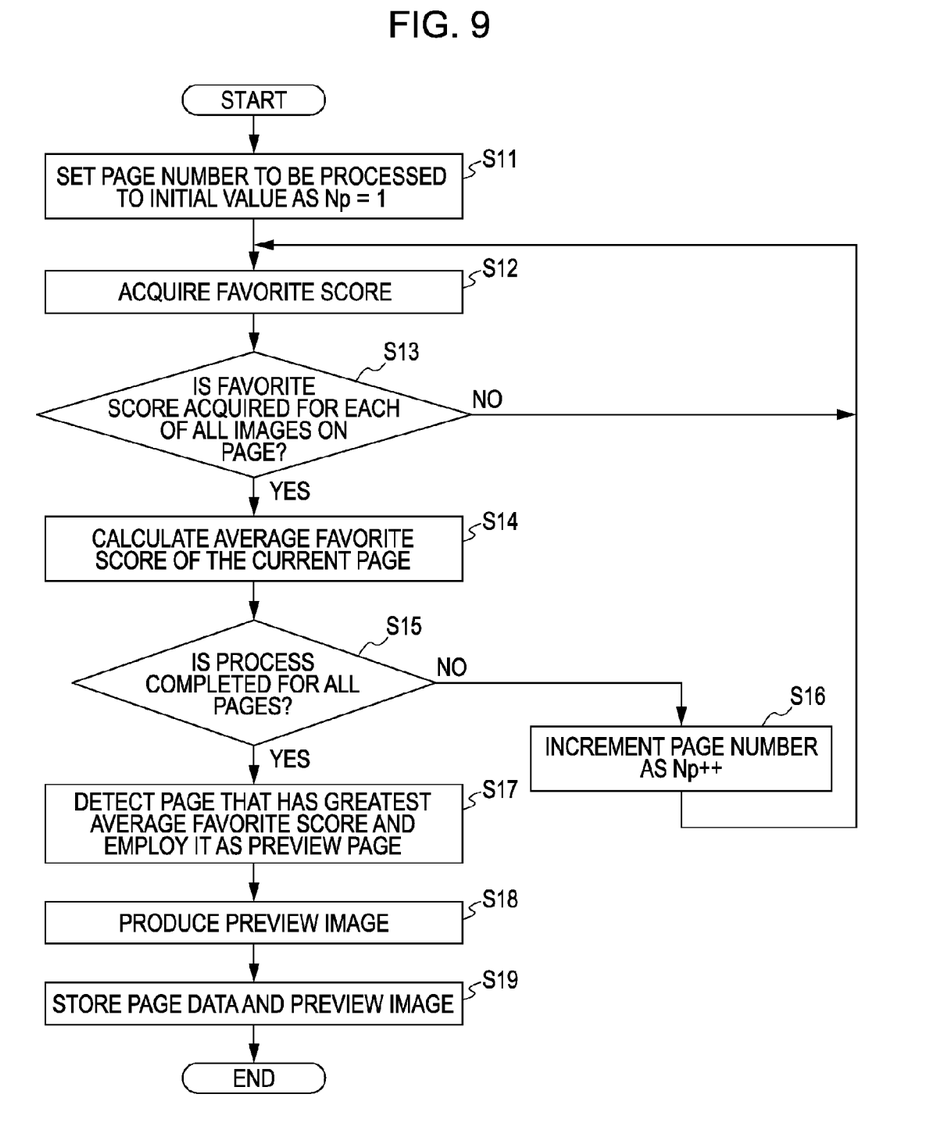
FIG. 9 is a flow chart illustrating a process of determining a page to be displayed as a preview image in a page data storing process (step S6) in the flow chart shown in FIG. 2.

FIG. 9 is a flow chart illustrating a process of determining a page to be displayed as a preview image in the page data storing process (step S6) shown in FIG. 2.

First, in step S11, the page number, Np, of a page for which the evaluation value is to be calculated from image data included in the page is set to 1, i.e., Np=1. In step S12, the score of favorite of each piece of image data included in the Np-th page (i.e., the page whose page number is Np) is read. In step S13, a determination is made as to whether the score of favorite has been acquired for all images included in the Np-th page.

If the determination in step S13 is that the score of favorite has not been acquired for all images in the Np-th page, the process in step S12 is performed repeatedly until the score of favorite has been acquired for all images in the Np-th page. If it is determined in step S13 that the score of favorite has been acquired for all images in the Np-th page, then, in step S14, the mean value of scores of favorite of images in the Np-th page is calculated.

Next, in step S15, a determination is made as to whether the calculation of the mean value of scores of favorite is completed for all pages. If the determination in step S15 is that the calculation of the mean value of scores of favorite is not completed for all pages, then, in step 16, the page number, Np, of the page for which the evaluation value is to be calculated from image data included in the page is incremented by 1. Thereafter, the process from step S12 to step S15 is repeated.

If it is determined in step S15 that the calculation of the mean value of scores of favorite is completed for all pages, then, in step S17, a page having a greatest mean value of scores of favorite is selected as a preview page. In step S18, a preview image corresponding to the page selected in step S17 is produced.

The preview image is displayed by the file display/selection application software 1. The maximum allowable size of the preview image is 256×256 pixels. In the production of the preview image, the original page is reduced into a size within the maximum allowable size of 256×256 pixels while maintaining the aspect ratio of its original page. For example, if the selected page has a A4 size (210×297 mm), the preview image is produced such that it has a size of 181×256 pixels.

In step S19, the preview image produced in step S18 is combined with the page data and the resultant data is stored in a file. In the file display pane 33, preview images stored in the files existing in the folder selected in the folder selection pane 32 are displayed as representative pages of the respective files.

In the first embodiment described above, the preview image is determined based on the score of favorite of image data included in each page. However, the preview image may be determined differently as described below.

Figure 10:
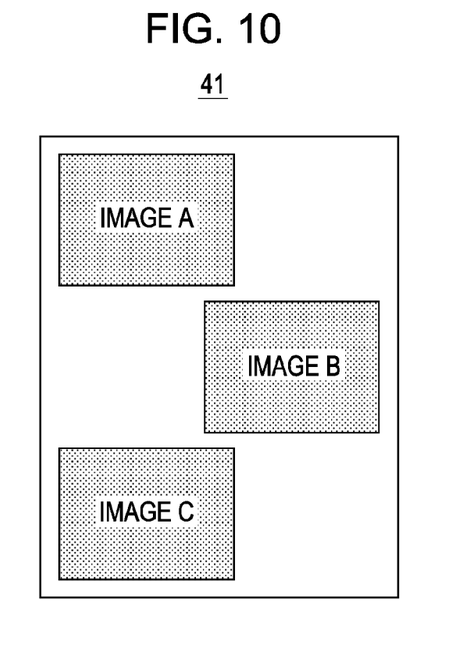
FIG. 10 is a diagram illustrating an example of a set of preview images.

FIG. 10 illustrates an example of a set of preview images 41.

Figure 11:
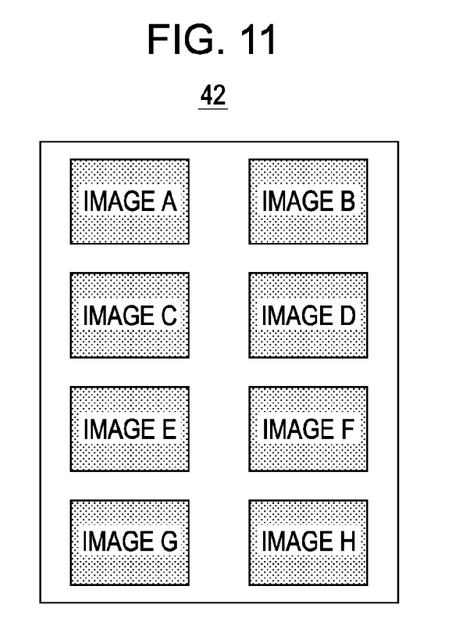
FIG. 11 is a diagram illustrating an example of a set of preview images.

FIG. 11 illustrates another example of a set of preview images 42.

In the preview images 42 shown in FIG. 11, each of the preview images placed in a page area has a smaller size than that of the preview images 41 shown in FIG. 10, and thus it is difficult to recognize the contents of the files from the preview images 42.

In a second embodiment, in view of the above, the preview image is determined taking into account the size of images disposed in each page in addition to the factors taken into account in the process according to the first embodiment described above.

Figure 12:
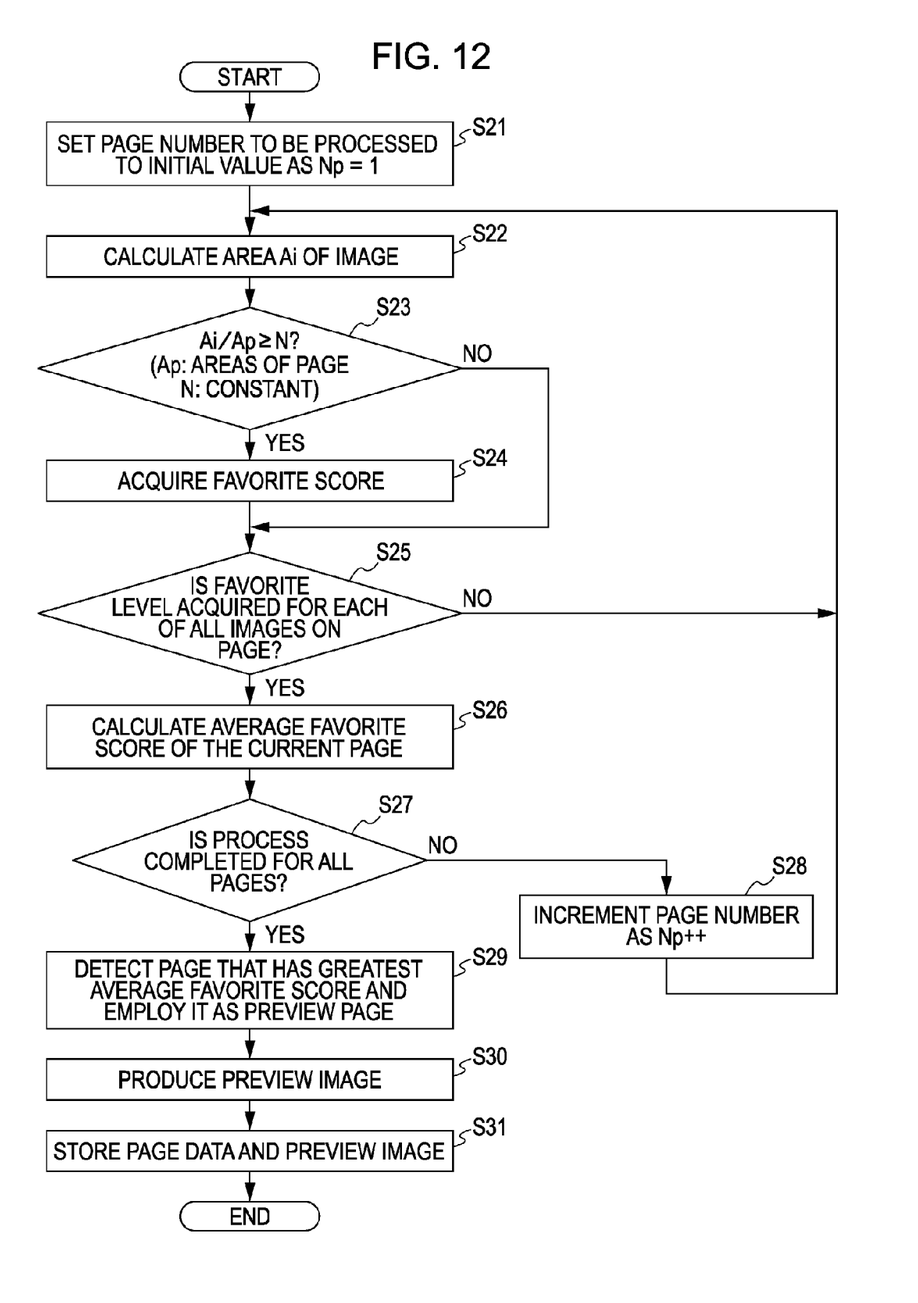
FIG. 12 is a flow chart illustrating a process of determining a page to be displayed as a preview image in a page data storing process (step S6) in the flow chart shown in FIG. 2 according to an embodiment of the invention.

FIG. 12 is a flow chart illustrating a process of determining a page to be displayed as a preview image in the page data storing process (step S6) shown in FIG. 2 according to the second embodiment.

First, in step S21, the page number, Np, of a page for which the evaluation value is to be calculated from image data included in the page is set to 1, i.e., Np=1. In step S22, the area Ai of image data located in the Np-th page is calculated. In step S23, it is determined whether the ratio of the area Ai to the page area Ap is equal to or greater than a predetermined value N, i.e., it is determined whether a condition (1) shown below is satisfied.

$$Ai/Ap \geq N \ (N \text{ is a constant}) \quad (1)$$

If the condition (1) is satisfied, then in step S24, the score of favorite of the image data is read. Next, in step S25, a determination is made as to whether the score of favorite has been acquired for all images included in the Np-th page. If the condition (1) is not satisfied, the processing flow proceeds to step S25 without reading the score of favorite of the image data.

Thereafter, steps S26 to S31 are performed in a similar manner to steps S14 to S19 according to the first embodiment described above with reference to FIG. 9.

A third embodiment is described below. In this third embodiment, a criterion for selecting a preview image is specified by a user, and a page with highest similarity to the specified criterion is selected as a preview image.

Figure 13:
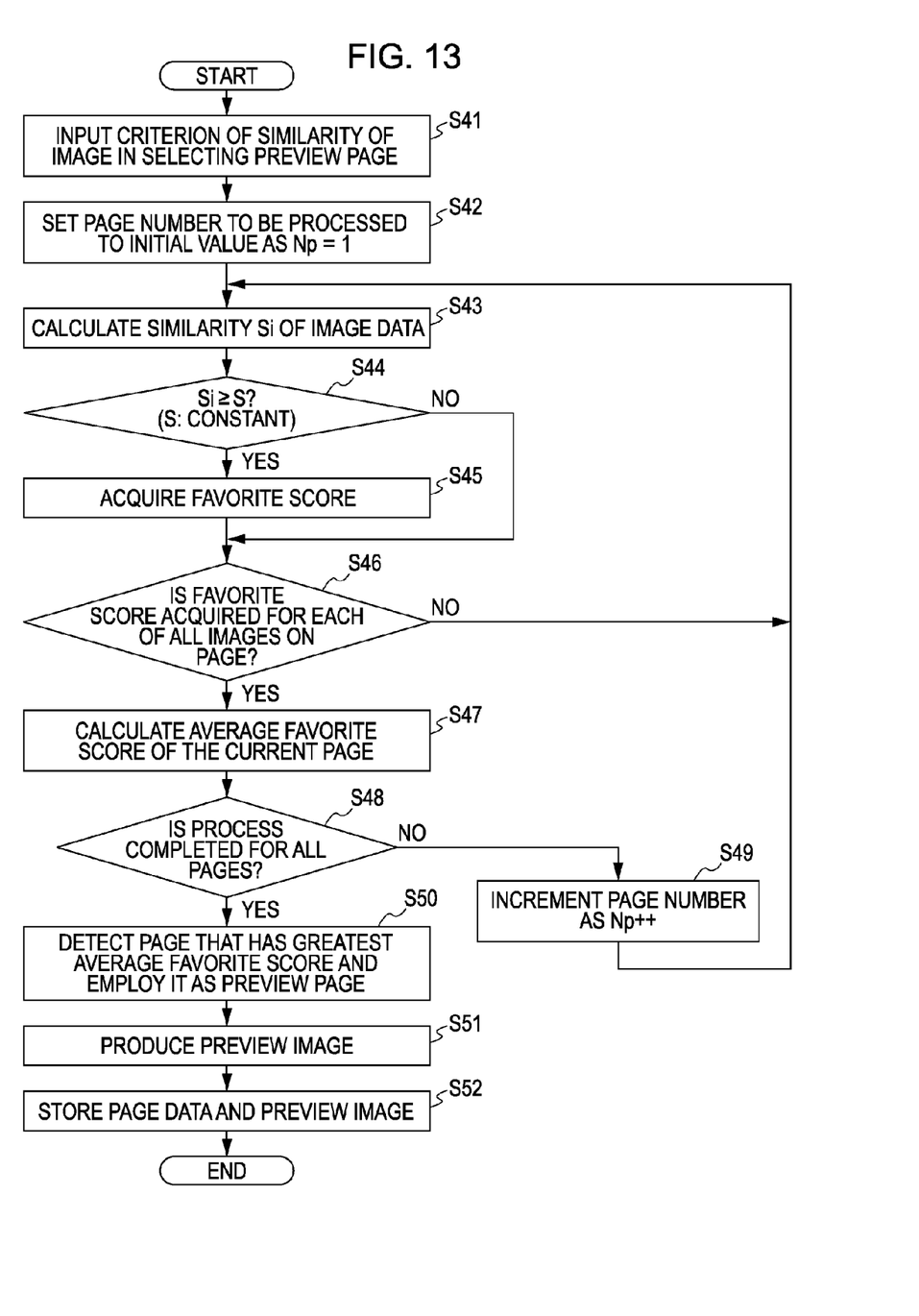
FIG. 13 is a flow chart illustrating a process of determining a page to be displayed as a preview image in a page data storing process (step S6) in the flow chart shown in FIG. 2 according to an embodiment of the invention.

FIG. 13 is a flow chart illustrating a process of determining a page to be displayed as a preview image in the page data storing process (step S6) shown in FIG. 2 according to the third embodiment.

First, in step S41, a criterion for an image to be selected as a preview page is input. An example of a criterion for the image is that the image should include a person A. Another example of a criterion is that the image should include a smiling face. In step S42, the page number, Np, of a page for which the evaluation value is to be calculated from image data included in the page is set to 1, i.e., Np=1.

In step S43, the similarity Si of image data with respect to the criterion input in step S41 is calculated. The calculation of the similarity Si may be performed using a common calculation algorithm. In step S44, it is determined whether the similarity Si for the image data with respect to the criterion is equal to or greater than S (S is a constant).

If it is determined in step S44 that the similarity Si of the image data is equal to or greater than the constant S, then in step S45, the score of favorite of the image data is read. Next, in step S46, a determination is made as to whether the score of favorite has been acquired for all images included in the Np-th page. In the case where it is determined in step S44 that the similarity Si of the image data is lower than the constant S, the processing flow proceeds to step S46 without reading the score of favorite of the image data.

Thereafter, steps S47 to S52 are performed in a similar manner to steps S14 to S19 according to the first embodiment described above with reference to FIG. 9.

In a fourth embodiment described below, associated information such as score of favorite of an image file is changed depending on a property of a page in which image data is located, and the evaluation value of each page is calculated based on the changed score of favorite.

Figure 14:
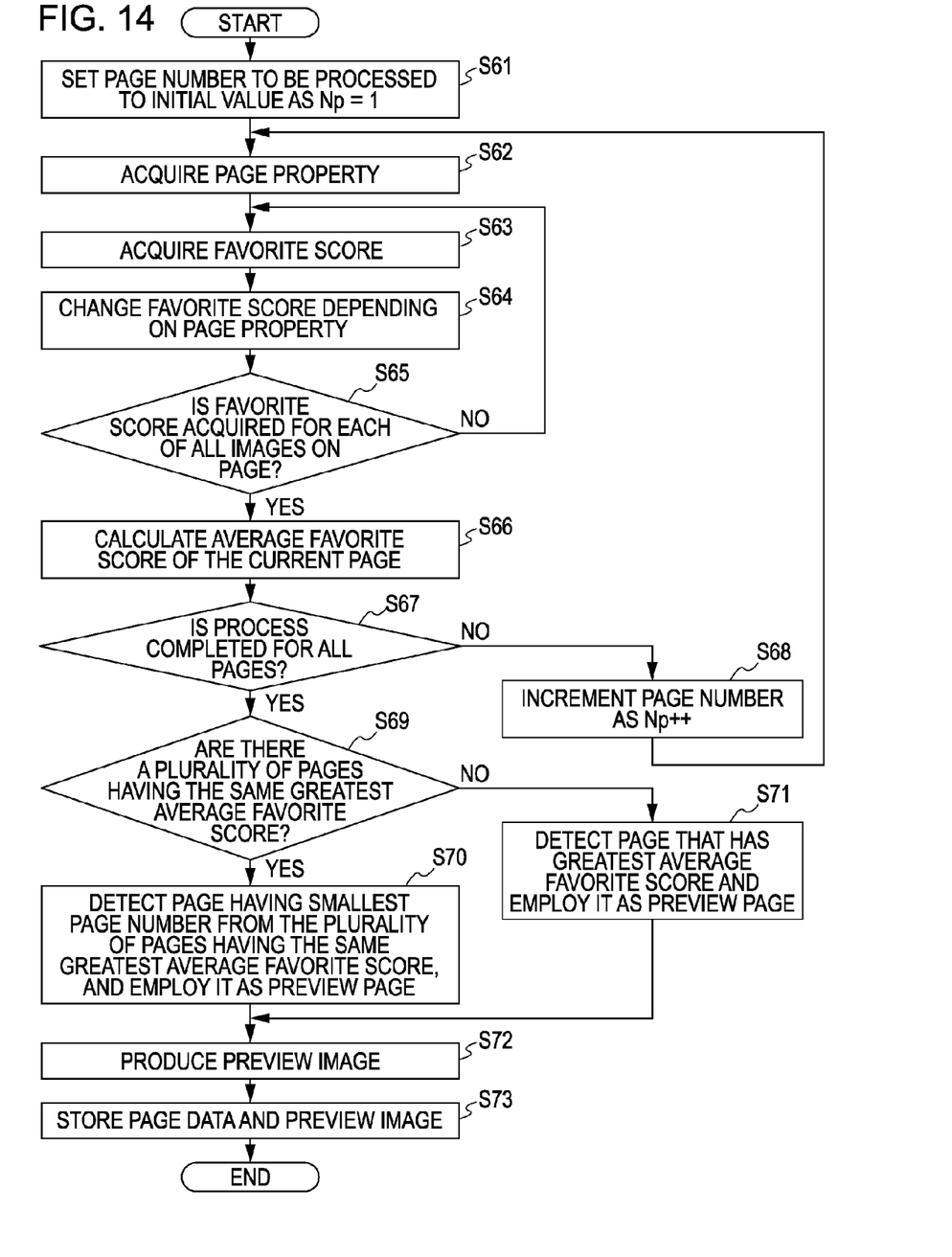
FIG. 14 is a flow chart illustrating a process of determining a page to be displayed as a preview image in a page data storing process (step S6) in the flow chart shown in FIG. 2 according to an embodiment of the invention.

FIG. 14 is a flow chart illustrating a process of determining a page to be displayed as a preview image in the page data storing process (step S6) shown in FIG. 2 according to the fourth embodiment.

In step S61, the page number, Np, of a page for which the evaluation value is to be calculated from image data included in the page is set to 1, i.e., Np=1. In step S62, the page property of the Np-th page to be processed is acquired. The page property may be one of "cover sheet", "primary title", "secondary title", "third title", and "others". Next, in step S63, the score of favorite of each piece of image data included in the Np-th page (i.e., the page whose page number is Np) is read.

Figure 15:
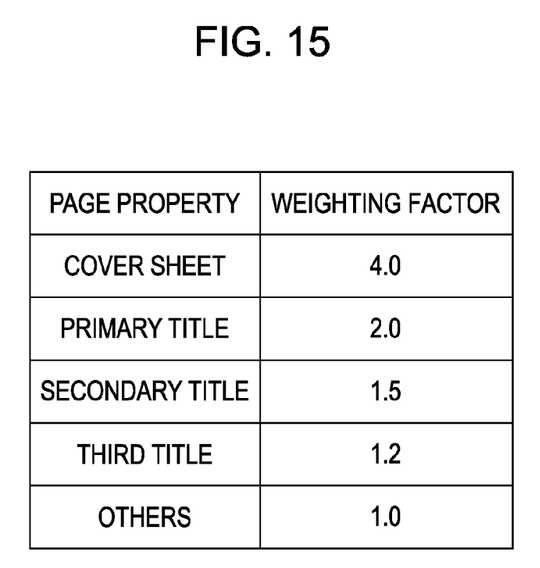
FIG. 15 is a table illustrating page properties and weighting factors assigned thereto according to an embodiment of the invention.

FIG. 15 illustrates page properties and weighting factors assigned thereto according to the fourth embodiment.

In step S64, the table indicating the weighting factors for the respective page properties shown in FIG. 15 is searched according to the page property acquired in step S62 to determine the weighting factor for the score of favorite, and the score of favorite is changed using the determined weighting factor.

In step S65, a determination is made as to whether the score of favorite has been acquired for all images included in the Np-th page. If the determination in step S65 is that the score of favorite has not been acquired for all images in the Np-th page, the process in steps S63 and 64 is performed repeatedly until the score of favorite has been acquired for all images in the Np-th page. If it is determined in step S65 that the score of favorite has been acquired for all images in the Np-th page, then, in step S66, the mean value of scores of favorite of images in the Np-th page is calculated.

Next, in step S67, a determination is made as to whether the calculation of the mean value of scores of favorite is completed for all pages. If the determination in step S67 is that the calculation of the mean value of scores of favorite is not completed for all pages, then in step S68, the page number, Np, of the page for which the evaluation value is to be calculated from image data included in the page is incremented by 1. Thereafter, the process from step S62 to step S67 is repeated.

If it is determined in step S67 that the calculation of the mean value of scores of favorite is completed for all pages, then in step S69, a determination is made as to whether there are a plurality of pages having the same greatest mean value of scores of favorite. If it is determined in step S69 that there are a plurality of pages having the same greatest mean value of scores of favorite, the processing flow proceeds to step S70. In step S70, a page having a smallest page number is detected from the plurality of pages having the same greatest mean value of scores of favorite, and the detected page is determined as the preview image.

In the case where it is determined in step S69 that there is only one page that has the greatest mean value of scores of favorite, then in step S71, this page having the greatest mean value of scores of favorite is selected as the preview page. In step S72, a preview image corresponding to the page selected in step S70 or S71 is produced.

The preview image is displayed by the file display/selection application software 1. Thereafter, in step S73, the preview image produced in step S72 and the page data are stored in a file.

The embodiments described above may be applied to a system including a plurality of devices or apparatuses (such as a host computer, an interface device, a reader, a printer, etc. or may be applied to a single apparatus (such as a copy machine, a facsimile machine, etc.).

Note that each unit or part in each embodiment may be replaced with a corresponding processing step thereby achieving a method corresponding to the embodiment of the invention.

Furthermore, the present invention may also be embodied in the form of a computer-readable storage medium in which a program that implements any of the embodiments described above is stored. That is, a program code according to each embodiment may be stored in a computer-readable storage medium, the computer-readable storage medium may be supplied to a system or an apparatus. The program code may be read from the storage medium by a computer (or a CPU, a MPU, etc.) disposed in the system or the apparatus. In this case, it should be understood that the program code read from the storage medium implements the functions of embodiments and thus the storage medium storing the program code falls within the scope of present invention. Specific examples of the computer-readable storage medium include a CD, a DVD, a HD, an optical disk, a magneto-optical disk, a semiconductor memory, etc.

Part or all of the process may be performed by an operating system or the like running on the computer in accordance with the program code thereby achieving the functions of the embodiments of the invention.

The program code may be loaded from the storage medium into a memory provided on a function extension board inserted in the computer or a memory provided in a function extension unit connected to the computer, and part or all of the process may be performed by a CPU disposed on the extension card or the extension unit in accordance with the loaded program code thereby achieving the functions of the embodiments of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-237498, filed on Sep. 17, 2008, which is hereby incorporated by reference herein in its entirety.

What is claimed is:

1. An image processing apparatus for processing an image file including a plurality of pages and a plurality of pieces of image data, comprising:
   an evaluation value acquisition unit that acquires an evaluation value described in each piece of image data that satisfies a predetermined criteria;
   a page determination unit that determines a representative page of the image file including the plurality of pages and the plurality of pieces of image data;
   the page determination unit being adapted to:
      calculate an evaluation value of each page of the image file based on the evaluation value described in each piece of image data acquired by the evaluation value acquisition unit; and
      determine the representative page based on the result of the calculation; and
   an input unit allowing a user to input a condition for an image to be displayed as a preview image, wherein the predetermined criteria includes similarity between the condition input by the input unit and the image data in the image file, the similarity being larger than a predetermined value.

2. The image processing apparatus according to claim 1, wherein the predetermined criteria includes an area of image data in a page larger than a predetermined area.

3. The image processing apparatus according to claim 1, wherein the page determination unit determines the representative page such that a page for which the result of the calculation has a greatest value is selected as the representative page.

4. The image processing apparatus according to claim 1, wherein the page determination unit determines the representative page such that a page for which the mean value of evaluation values of the image data per page has a greatest value is selected as the representative page.

5. The image processing apparatus according to claim 1, further comprising:
   a second evaluation value acquisition unit that acquires a second evaluation value described in each page of the image file; and
   a changing unit that changes the acquired evaluation value based on the second evaluation value acquired by the second evaluation acquisition unit, wherein
   the page determining unit calculates the evaluation value for each page of the image filed based on an evaluation value changed by the changing unit and the page determination unit determines the representative page according to the result of the calculation.

6. The image processing apparatus according to claim 1, wherein, in a case where multiple pages have a greatest evaluation value, the page determination unit determines a page having a smallest page number in the image file among the multiple pages having the greatest evaluation value as the representative page.

7. The image processing apparatus according to claim 1, wherein the representative page is the page displayed as the preview image.

8. A method of controlling an image processing apparatus capable of processing an image file including a plurality of pages and a plurality of pieces of image data, comprising:
   acquiring an evaluation value described in each piece of image data that satisfies a predetermined criteria; and
   determining a representative page of the image file including the plurality of pages and the plurality of pieces of image data;
   the determining the representative page including:
      calculating an evaluation value of each page of the image file based on the evaluation value described in each piece of image data acquired in the acquiring the evaluation value; and
      determining the representative page based on the result of the calculation; and
   inputting a condition for an image to be displayed as a preview image, wherein the predetermined criteria includes similarity between the condition input by the input unit and the image data in the image file, the similarity being larger than a predetermined value.

9. A non-transitory computer-readable storage medium in which a computer program is stored, the program causing a computer to control an image processing apparatus capable of processing an image file including a plurality of pieces of image data forming a plurality of pages, the computer program causing the computer to execute the steps of:
   acquiring an evaluation value described in each piece of image data that satisfies a predetermined criteria;
   determining a representative page of the image file including the plurality of pages and including the plurality of pieces of image data;
   the determining the representative page including:
      calculating an evaluation value of each page of the image file from the evaluation value described in each piece of image data acquired in the acquiring the evaluation value; and
      determining the representative page based on the result of the calculation; and
   inputting a condition for an image to be displayed as a preview image, wherein the predetermined criteria includes similarity between the condition input by the input unit and the image data in the image file, the similarity being larger than a predetermined value.

10. The non-transitory computer-readable storage medium according to claim 9, wherein the computer program further causes the computer to execute a step of acquiring information described in the image file, wherein the determining the representative page includes calculating the evaluation value for each page of the image file based on the evaluation value acquired in the acquiring the evaluation value and the acquired information described in the image file.

* * * * *